(12) United States Patent
Krehbiel, Jr. et al.

(10) Patent No.: US 7,010,646 B2
(45) Date of Patent: Mar. 7, 2006

(54) METHODS AND STRUCTURE FOR IMPROVED VOLUME MIGRATION BETWEEN STORAGE ARRAY SUBSYSTEMS

(75) Inventors: Stanley Krehbiel, Jr., Wichita, KS (US); William Hetrick, Wichita, KS (US); Joseph Moore, Wichita, KS (US); William Delaney, Wichita, KS (US); Carey Lewis, Wichita, KS (US); Scott Hubbard, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 408 days.

(21) Appl. No.: 10/395,558

(22) Filed: Mar. 24, 2003

(65) Prior Publication Data

US 2004/0193800 A1    Sep. 30, 2004

(51) Int. Cl.
*G06F 12/00* (2006.01)
(52) U.S. Cl. .................. 711/114; 711/115; 711/170
(58) Field of Classification Search ............... None
See application file for complete search history.

(56) References Cited

U.S. PATENT DOCUMENTS

| | | | |
|---|---|---|---|
| 6,336,163 B1 * | 1/2002 | Brewer et al. ............ | 711/112 |
| 6,434,682 B1 * | 8/2002 | Ashton et al. ............ | 711/162 |
| 6,684,231 B1 * | 1/2004 | Cabrera et al. ............ | 707/205 |
| 6,779,078 B1 * | 8/2004 | Murotani et al. .......... | 711/112 |
| 6,816,941 B1 * | 11/2004 | Carlson et al. ............ | 711/111 |
| 6,895,485 B1 * | 5/2005 | DeKoning et al. ......... | 711/170 |
| 6,938,120 B1 * | 8/2005 | Gibble et al. ............. | 711/112 |
| 2001/0054133 A1 * | 12/2001 | Murotani et al. .......... | 711/114 |
| 2004/0044851 A1 * | 3/2004 | Dawson et al. ............ | 711/154 |

* cited by examiner

*Primary Examiner*—Kevin Verbrugge
(74) *Attorney, Agent, or Firm*—Duft, Bornsen & Fishman LLP

(57) ABSTRACT

Methods and associated structure for migrating storage devices between storage subsystems. A storage device to be removed from a storage subsystem is first "exported" by altering configuration data stored on the storage device. The altered configuration information helps assure that the storage device will be recognized as a foreign device in any storage subsystem into which it is subsequently inserted. Forcing recognition of the storage device as a foreign storage device in any subsystem helps assure predictability of the process of importing the storage device into a new system and helps reduce the risk of data loss when reinserting the storage device into a storage subsystem. Storage devices so migrated may include individual disk drives as well as entire volumes comprising one or more disk drives.

21 Claims, 3 Drawing Sheets

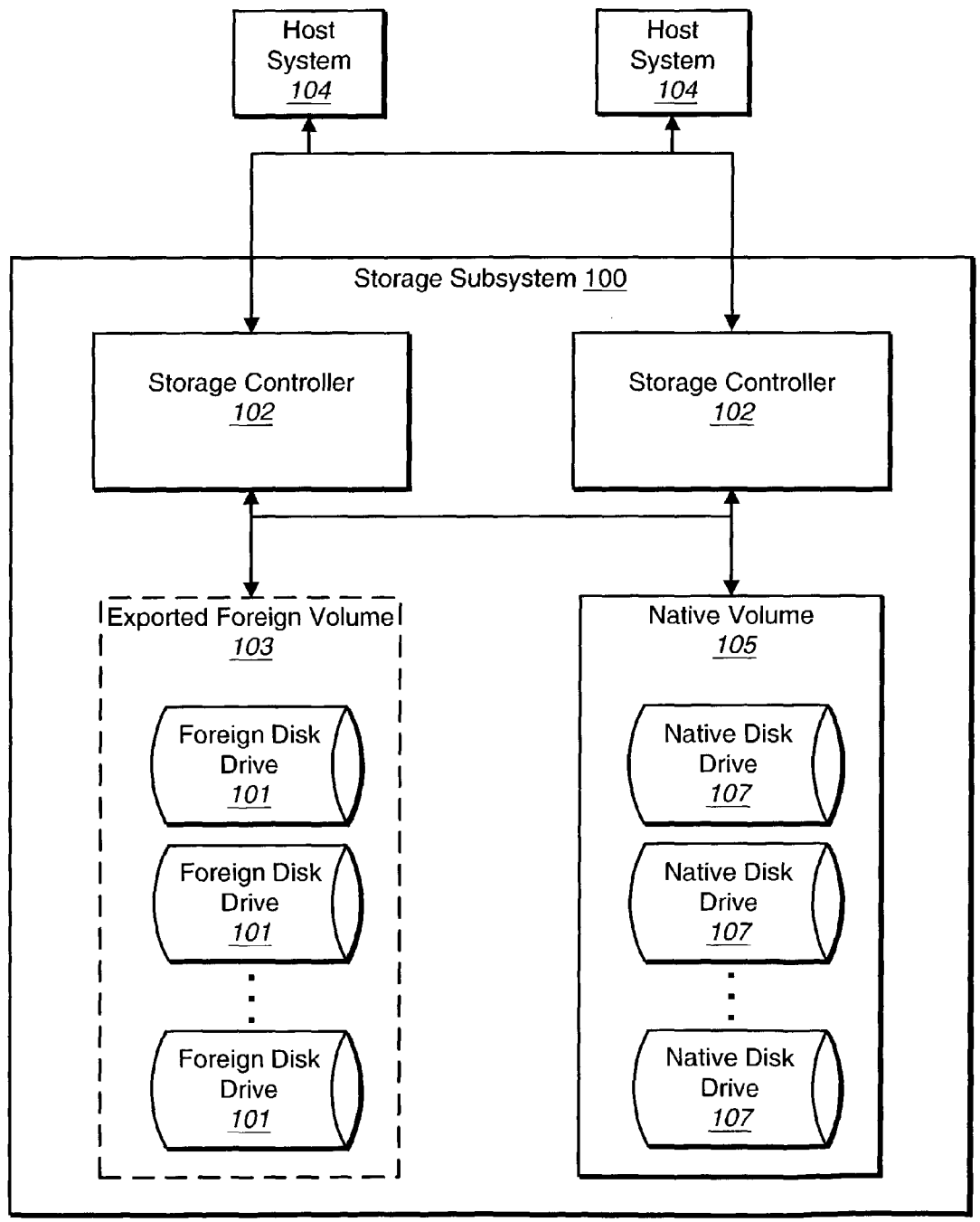
FIG._1

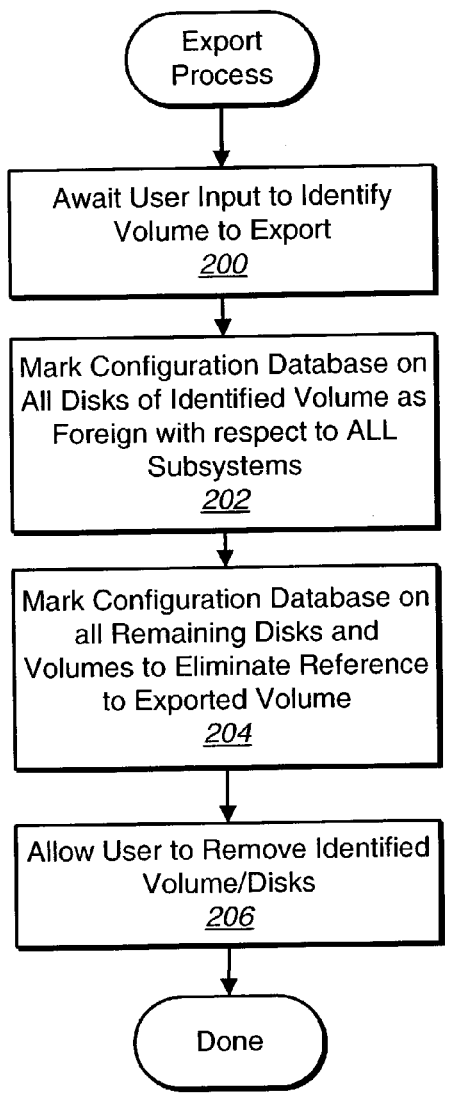
FIG._2
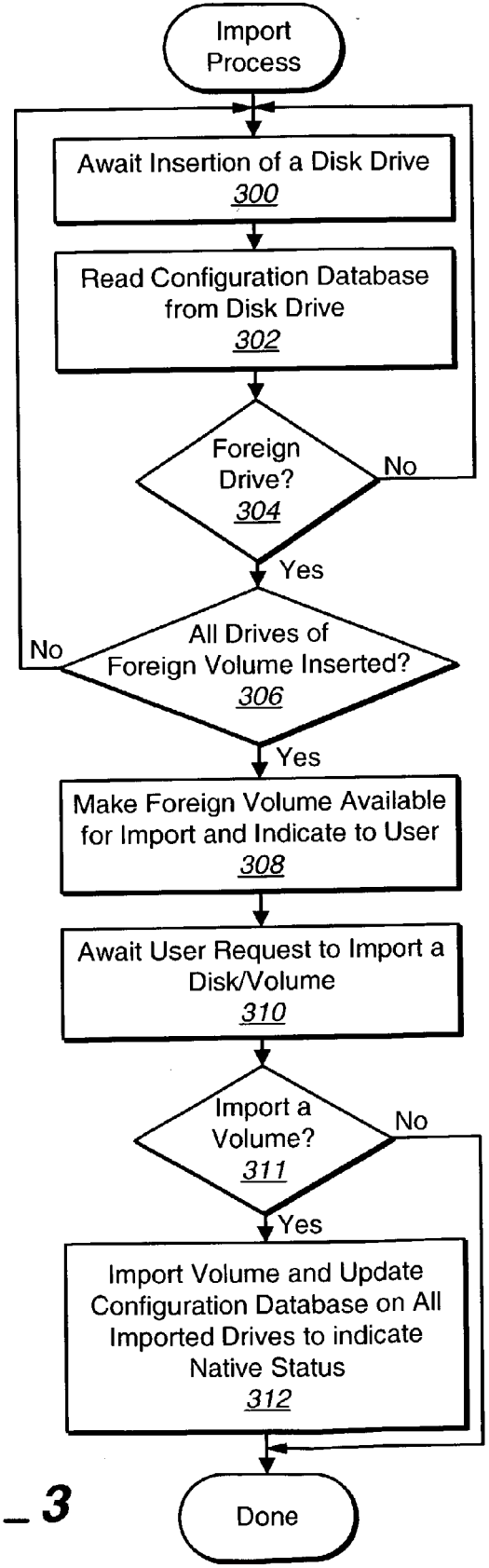
FIG._3

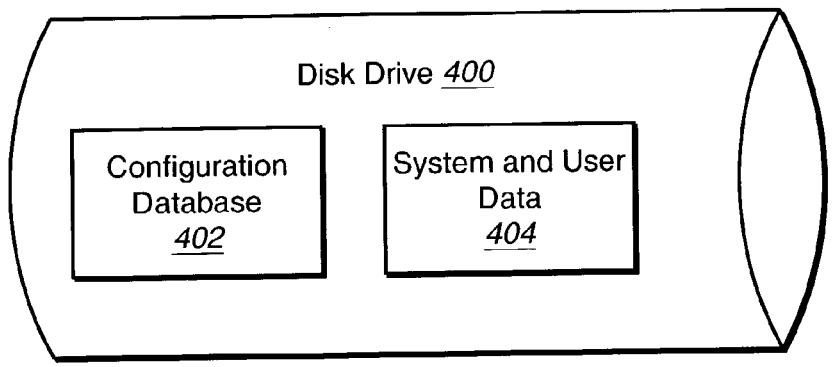
FIG._4
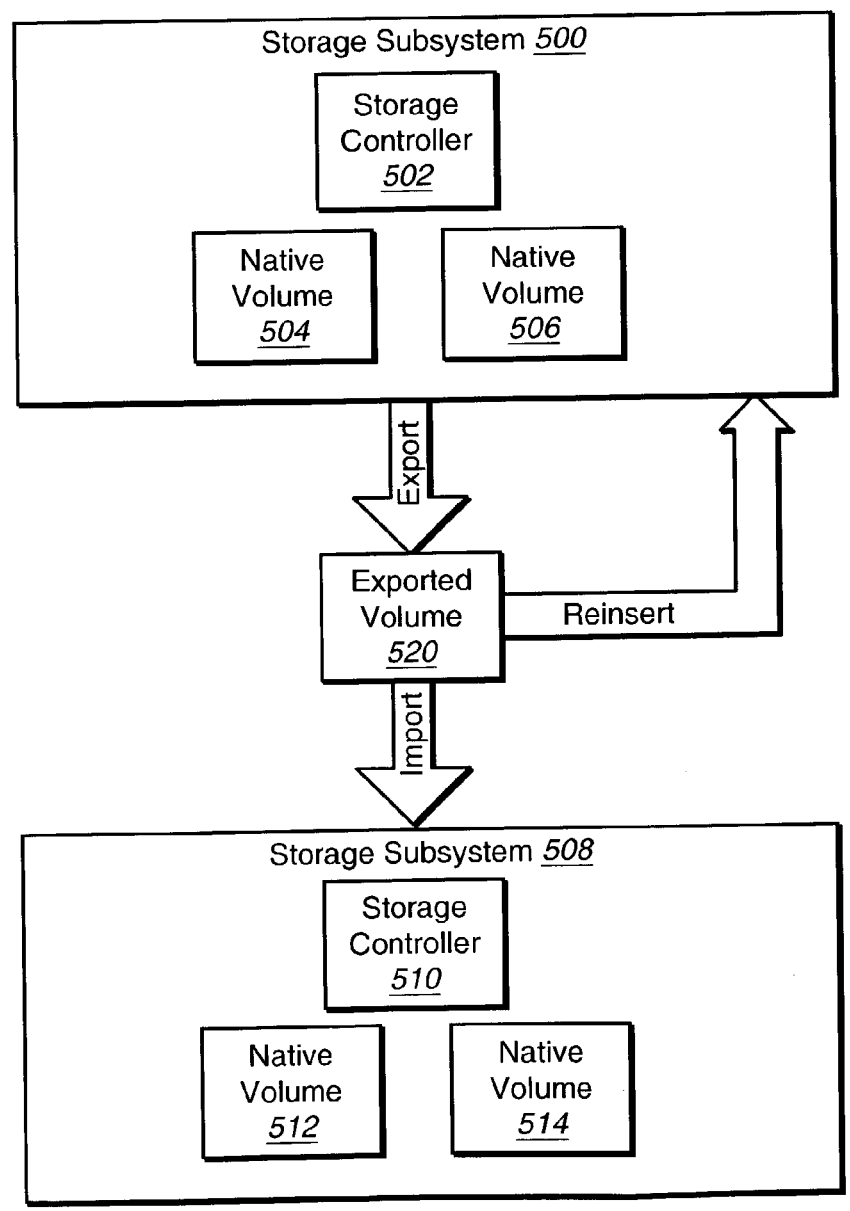
FIG._5

METHODS AND STRUCTURE FOR IMPROVED VOLUME MIGRATION BETWEEN STORAGE ARRAY SUBSYSTEMS

RELATED PATENTS

This patent application is related to co-pending, commonly owned U.S. patent application Ser. No. 10/395,512 entitled METHODS AND SYSTEMS FOR PRE-MERGE READ OF CONFIGURATION DATA FROM A FOREIGN VOLUME GROUP INSERTED IN STORAGE ARRAYS, filed Mar. 24, 2003 and hereby incorporated by reference.

BACKGROUND OF THE INVENTION

1. Field of the Invention

The invention relates generally to storage subsystems and is particularly applicable to array storage subsystems with multiple volumes wherein volumes may be physically exported and imported among multiple such array storage subsystems.

2. Discussion of Related Art

Computer systems use storage devices for storage and retrieval of data as well as programs. As computing applications have evolved, so to have demands on storage devices for increased capacity, speed and reliability. Storage devices have evolved from simple single disk devices to complex subsystems with substantial local control capabilities for extensive local management of storage.

Present day storage subsystems may incorporate local management capabilities for improved performance as well as enhanced reliability. Storage management techniques for enhanced performance may include features such as striping to distribute data over multiple individual disk drives in the subsystem so that any particular I/O operation may be completed by using multiple disk drives operating in parallel. Other storage management techniques, so-called RAID storage management, enhance reliability of storage subsystem by including redundancy information to permit ongoing operations of the storage subsystem despite loss of one or more of the individual disk drives.

Such high-performance, high reliability storage subsystems often subdivide or partition the total storage capacity of the subsystem into logical groupings referred to as volumes or logical units ("LUNs"). Each such volume may comprise a portion of the total capacity of the storage subsystem including some portion of one or more of a plurality of disk drives within the storage subsystem. Further, each disk drive within the storage subsystem may have portions of its individual capacity allocated to zero or more such volumes.

Each volume of such a storage subsystem is generally presented to attached host systems as a single high capacity, high-performance, high reliability storage device. Hidden from the host system is the "geometry" of the volume—the distribution of data over multiple disk drives and use of redundancy information. In other words, local control processing capabilities within the storage subsystem provide mapping of logical storage locations into corresponding physical locations on the individual disk drives and provide for generation and verification of redundancy information.

Many present day computing and storage applications involve not only one such array storage subsystem but potentially many such array storage subsystems. Each storage subsystem may provide one or more volumes of storage for a host system or a plurality of networked computing devices. Some volumes may be configured to optimize for performance while other volumes may be optimized for reliability depending upon the needs of particular computing applications. System administrators for such complex storage applications utilize tools to help configure the multiplicity of volumes associated with such complex storage applications. As particular applications within the administrator's enterprise increase or decrease their need for storage, the system administrator may dynamically reconfigure various aspects of the storage subsystems. Such reconfiguration may include, for example, migrating an entire volume physically from one array storage subsystem to another array storage subsystem. Such migration may be useful to provide added capacity for a particular computing application associated with a particular storage subsystem where excess capacity is available in another storage subsystem.

In addition, in certain high security storage applications, it is desirable to physically remove an entire volume of storage for security reasons such that the volume may be reinstalled in the same storage subsystem at a later time. While removed however, the information on the storage volume may be physically secured from unauthorized access.

In general, as presently known in the art, configuration information is stored on the disk drives of a volume. The configuration information may indicate the storage array subsystem in which the volume is presently operating. Within that identified storage subsystem, the volume and disk drives are referred to as "native". The same information relative to other storage array subsystems defines the disk drives and volume as "foreign" with respect to such other storage array subsystems. When individual disk drives are inserted into a storage subsystem, the controller(s) of that storage subsystem read the configuration information from the disk drives and determine if the individual disk drive is native or foreign with respect to that storage array subsystem. Similarly, if all disk drives of a volume are inserted into a system, the volume may be identified as foreign or native to that storage system. The information read from the disk drives also includes information regarding the volumes in which each disk drive was a member. When the controller of the storage array reads the configuration information from the disk drive and determines that disk drive is foreign with respect to that storage array subsystem, the user may be prompted to indicate whether the volume or volumes associated with this drive are to be "imported" into the storage array.

Some present techniques and storage systems attempt to automate the importation of disks and volumes into a storage system. These present techniques essentially depend on the user changing the status of the affected volume/disks to "offline" (i.e., not presently accessible for storage operations. When such an "offline" disk or volume is inserted into a storage subsystem, the subsystem attempts to automatically import the disks or volumes.

A number of problems are known in the art with regard to such automated importation of foreign disk drives and volumes. First, the technique is somewhat inconsistent. The response of the system into which the "offline" disk or volume is inserted depends on the state of the system. If the system is powered up when the "offline" disk or volume is inserted, the inserted disk/volume will be brought "online" and hence made usable. If the storage system is powered off when the disk/volume is inserted, the inserted disk/volume will remain "offline" when the system is later powered up.

Still further, if the user neglects to set the disk/volume in the "offline" state prior to removing it from the first system, the disk/volume will be automatically placed online in the new system in which it is inserted. The results of this present technique are somewhat difficult for users to understand and seemingly non-deterministic.

A second problem may arise under the present techniques if a volume is reinserted into the system from which it was removed. If the other drives of the system are reconfigured after removal of a disk/volume such that configuration information is updated, the removed volume when reinserted will appear as a native set of devices but having old configuration information. Some systems so recognizing old configuration information may update the configuration information by overwriting the apparently old information with the newly configured information. Such a sequence risks loss of data in the volume so reinserted and hence lost to the storage system.

These and other problems make it evident that a need exists for improved techniques to manage migration of volumes between storage array systems and for reinsertion of a volume into a storage array subsystem.

SUMMARY OF THE INVENTION

The present invention solves the above and other problems, thereby advancing the state of the useful arts, by providing methods and associated structure for migrating storage of volumes between storage array systems and for managing reinsertion of a storage volume into the storage array subsystem. More specifically, the present invention includes methods and associated structure for exporting a volume from a storage array subsystem so that the disk drives of the volume will appear as foreign drives in any subsystem into which they may be inserted. Such methods and structure help assure that the results of inserting a volume into a storage subsystem will be predictable and avoid risk of unintended loss of data when reinserting a volume into a storage subsystem.

A feature of the invention therefore provides systems and a method for importing a storage device into a storage subsystem comprising: exporting the storage device; removing the storage device from a storage subsystem; and importing the storage device into a storage subsystem such that the exported storage device is recognized as a foreign storage device in the storage subsystem into which it is imported.

Another aspect of the invention further provides that the step of exporting comprises: altering configuration data stored on the storage device.

Another aspect of the invention further provides that the step of altering comprises: writing configuration information on the storage device such that the configuration information will indicate that the storage device is a foreign storage device in any storage subsystem in which it is later inserted.

Another aspect of the invention further provides that the step of writing comprises one or more of the following steps: writing a database identifier to a new value; writing a timestamp to a new value; and writing a controller identifier to a new value.

Another aspect of the invention further provides that the storage device is a storage volume consisting of a plurality of storage elements and that the step of exporting comprises: altering configuration data stored in each of the plurality of storage elements.

Another aspect of the invention further provides that the step of altering comprises: writing configuration information on each storage element such that the configuration information will indicate that each storage element is a foreign storage device in any storage subsystem in which it is later inserted.

Another aspect of the invention further provides that the step of writing comprises one or more of the following steps: writing a database identifier to a new value; writing a timestamp to a new value; and writing a controller identifier to a new value.

BRIEF DESCRIPTION OF THE DRAWINGS

FIG. 1 is a block diagram of a storage subsystem embodying features and aspects of the present intention to allow consistent importation of volumes into storage subsystems.

FIG. 2 is a flowchart describing an exemplary volume export method of the present invention.

FIG. 3 is a block diagram depicting an exemplary process of exporting, importing and/or reinserting a volume.

FIG. 4 is a block diagram depicting an exemplary disk drive including configuration database information useful in an embodiment of the present invention.

FIG. 5 is a flowchart describing and exemplary volume import method of the present invention.

DETAILED DESCRIPTION OF THE DRAWINGS

FIG. 1 is a block diagram showing a storage subsystem 100 embodying features of the present invention for importing and exporting of disk drives or volumes. Storage subsystem 100 may include one or more storage controllers 102 coupled to one or more host systems 104 via communication path 150. Those of ordinary skill in the art will readily recognize that storage subsystem 100 may include any number of storage controllers 102. As shown in FIG. 1, it is common for high-performance, high reliability storage subsystems to include at least two storage controllers 102. Duplicate storage controllers 102 provide redundancy in case of failure of one storage controller and may provide performance enhancements through parallel usage of the multiple controllers when not relied upon for redundancy. Further, those of ordinary skill in the art will readily recognize that communication path 150 may be any of several well-known communication media and protocols including, for example, parallel SCSI, Fibre Channel, Ethernet, and numerous other well-known storage communication media and protocols. Still further, those of ordinary skill in the art will recognize that many such communication media and protocol permit a storage subsystem 100 to communicate with multiple host systems as shown in FIG. 1. Any number of such host systems may be present and in communication with a storage subsystem 100.

Storage controllers 102 of storage subsystem 100 receive and process I/O requests from host systems 104. Host requests are processed by appropriate lower-level I/O operations to store and retrieve information on one or more storage volumes associated with the storage subsystem 100. As used herein, "volume" represents a logical partition of storage space in a storage subsystem 100. In general, a storage subsystem 100 includes one or more disk drives (i.e., disk drives 101 and disk drives 103) each capable of storing and retrieving information. A volume may comprise a portion of one or more such disk drives within a storage subsystem. Often, a volume may include the entire capacity of each of multiple disk drives within the storage subsystem. Therefore, as used herein, "volume" may refer to a portion of a single disk drive or portions of each of multiple disk drives in the storage subsystem. The portion of each disk drive may be any portion up to the entire capacity of the disk drive minus any reserved portions for configuration information as discussed below.

As shown in FIG. 1, volume foreign 103 comprises one or more foreign disk drives 101 and native volume 105 comprises one or more native drives 107. Those of ordinary skill in the art will readily recognize that any number of disk drives and/or portions of disk drives may be configured within a single volume. Further, any number of volumes may be configured within storage subsystem. Still further, those of ordinary skill in the art will recognize that disk drives 101 and disk drives 107 may be any type of storage element including, rotating magnetic or optical disk drives, fixed head rotating magnetic or optical disk drives, solid state disk drives (i.e., so-called RAM disks), or any other storage elements capable of storing and retrieving information.

Storage controllers 102 communicate with storage volumes 103 and 105 via communication path 152. Those of ordinary skill in the art will readily recognize that communication path 152 may be any of several well-known communication media and protocols useful in communicating between storage controllers and storage elements. Such communication media and protocols may include, for example, parallel SCSI, Fibre Channel, Storage Area Network ("SAN") architecture communications such as Infiniband and other well-known communication media and protocols.

Those of ordinary skill in the art will recognize that any number of redundant and/or parallel communication paths may be used in communicating between host systems 104 and storage controllers 102 as well as between storage controllers 102 and storage volumes 103 and 105. Such duplicate or redundant communication paths provide enhanced reliability in that redundant paths may be relied upon where the first path fails. Further, such duplicate paths may be used to enhance performance by providing multiple parallel channels of communication between host systems 104 and storage controllers 102 as well as between storage controllers 102 and storage volumes 103 and 105. Such redundancy enhancements and parallel performance enhancements are generally known to those of ordinary skill in the art.

As shown in FIG. 1, storage volume 103 is a foreign volume exported by a storage subsystem in accordance with features and aspects of the present invention. As noted above, the present invention provides methods and associated structure for exporting volumes to permit consistent migration of volumes between storage subsystems. The features of the invention also permit reinsertion of the volume into a storage subsystem in a manner that reduces risk of data loss. Exported foreign volume 103 may therefore represent a volume exported by storage subsystem 100 awaiting removal. In addition, exported foreign volume 103 may represent a volume exported by a storage system and recently inserted into storage subsystem 100.

FIG. 5 shows a schematic diagram depicting import, export and reinsertion of a storage volume. Storage subsystem 500 may include storage controller 502 and native volumes 504 and 506. Another storage subsystem 508 may include a storage controller 510 and native volumes 512 and 514. The native volumes in each storage subsystem 500 and 508 are known to their respective storage subsystem and may generally be online, operable and available for storage and retrieval of information. By contrast, exported storage volume 520 was at some point exported by storage subsystem 500 in accord with features of the present invention. Exported volume 520 is therefore available for importation or reinsertion. As shown in FIG. 5 exported volume 520 may be imported into storage subsystem 508 and thereby migrated in between storage subsystem 500 and storage subsystem 508. In addition, exported volume 520 may be reinserted into storage subsystem 500 from whence it was exported. Such removal and reinsertion of the storage volume may be useful, as noted above, for physical security of a storage volume in high security applications.

Returning again to FIG. 1, exported volume 103 is marked in accord with aspects and features of the present invention such that it is recognized as "foreign" with respect to any storage subsystem into which it may be inserted. By so marking the exported volume as foreign, insertion of the exported volume into any storage subsystem will evoke an orderly, consistent response allowing the user to determine whether and how to import the foreign volume.

Native volume 105 comprises a storage space known to storage subsystem 100. Such a native volume may be available for use by host systems 104 if and when enabled as online by storage management features of storage subsystem 100. In accordance with features and aspects of the present invention, any volume (103 and 105) to be removed from storage subsystem 100 should first be exported. As discussed further herein below, exporting of the volume may include marking information on each disk drive of the volume to signify that the disk drive, and hence the volume, is foreign with respect to this and any other storage subsystem. When a storage volume so marked by exportation as foreign is later inserted in a storage subsystem (or reinserted in the same storage subsystem), methods associated with features and aspects of the present invention allow the user to import the foreign volume(s) identified in the newly inserted disk drives. Further details of such exemplary methods are provided herein below.

FIG. 2 is a flowchart describing an exemplary method for exporting a volume of a storage subsystem. Element 200 is operable to await user input to identify a volume to be exported. Upon receipt of such input, element 202 is next operable to mark the configuration database on all disk drives associated with the volume as "foreign" with respect to all storage subsystems. As discussed further herein below, configuration database information on each disk drive may include information identifying a storage subsystem. In particular, the configuration database includes information that identifies the storage subsystem in which the volume resides as a "native" volume. Element 202 therefore modifies appropriate information in the configuration database to assure that the identified volume will be recognized as "foreign" with respect to all storage subsystems, including the storage subsystem from which it is being exported. xxx Element 204 is then operable to update configuration database information on all disk drives remaining in the storage subsystem as native volumes. The remaining volumes are updated to reflect that the exported volume is no longer present in the identified storage subsystem. Lastly and optionally, element 206 performs processing to enable a user to physically remove the exported volume. Such processing may include powering down the exported volume and/or unlocking physical restraints associated with the volume. The processing of step 206 may be skipped in storage subsystems devoid of such physical restraining mechanisms for volumes or controllable power to the volume.

FIG. 3 is a flowchart describing an exemplary method for importing a foreign volume in response to insertion of the disk drives of the volume in a storage subsystem. As noted above, an exported volume is marked in such a way as to be recognized as "foreign" with respect to all storage subsystems. Such an exported volume is then imported by processing of FIG. 3 to be recognized as "native" within the importing subsystem. Once so recognized as "native" within the importing subsystem, the volume may be made available for use by host systems attached to the importing storage subsystem. This import process provides a consistent user interaction to import inserted volumes as compared with prior techniques as discussed above.

Element 300 is first operable to await insertion of a disk drive associated with a volume to be imported. Element 302 next reads configuration database information from the newly inserted disk drive. Based on the configuration database information element 304 determines whether the newly inserted disk drives recognized as a foreign disk drive. As noted above, all disk drives associated with a previously exported volume are marked with configuration database information so as to be recognized as "foreign" with respect to all storage subsystems. If element 304 determines that the newly inserted disk drive is not foreign, processing continues by looping back to element 300 to await insertion of a next disk drive. If element 304 determines that the newly inserted drive is a foreign disk drive, element 306 is next operable to determine from the configuration database information whether all disk drives of a foreign volume have been inserted. If not, processing continues by looping back to element 300 to await insertion of additional disk drives.

When all disk drives of a foreign volume have been inserted into the importing storage subsystem, element 308 next informs the user of the availability of the exported volume for possible importation into the storage subsystem. As noted above, in accordance with features and aspects of the present invention, this method assures that the user of a storage subsystem will be consistently provided with an option of importing a newly inserted storage volume. By contrast, as noted above, prior techniques were inconsistent as regards user interaction to import a foreign volume.

Element 310 then awaits user input requesting importation of the newly inserted foreign volume. If the user indicates importation is desired, as determined by element 311, element 312 is next operable to complete the import process to thereby convert a foreign volume to a native volume. In particular, configuration database information in all disk drives of the imported foreign volume is updated with appropriate configuration information indicative of the "native" status of the volume with respect to the importing storage subsystem. As discussed further herein below, the configuration information may be converted such that the storage subsystem identification information reflects the identity of the importing storage subsystem thus converting a foreign volume to a native volume for the importing subsystem.

Those of ordinary skill in the art will recognize a wide variety of equivalent methods and processes for implementing the export and import features and aspects of the present invention. FIGS. 2 and 3 are therefore intended merely as suggestive of numerous similar processes that may be implemented to provide these features and aspects of the invention.

FIG. 4 is a block diagram depicting a typical disk drive useful in accord with features and aspects of the present invention. Drive 400 includes system and user data storage area 404 for storage and retrieval of data supplied by attached host systems. In addition, disk drive 400 includes a reserved section for storage and retrieval of configuration database 402. As noted above, configuration database information 402 may include identification information regarding the storage subsystem in which the volume is considered "native". Those of ordinary skill in the art will recognize that disk 400 is intended merely as representative of the use of configuration database information on an area of a disk drive to indicate the storage system in which the associated volume is identified as "native." Nothing in FIG. 4 is intended to suggest the relative size of the configuration database relative to the entire disk size nor relative to the system and user data area. Typically, the configuration database area will be a relatively small portion of the total capacity of the disk drive. Further, the space for the configuration database may be anywhere convenient for the particular application of the disk drive.

As noted above, the configuration information may include any information useful to identify the storage subsystem in which the volume is deemed "native". Such identification information may include any of several appropriate indicia including, for example:

a timestamp value indicating a particular time that the volume was recognized as native
a controller ID
a configuration database ID For example, an exemplary configuration database identifying a particular storage subsystem may include the following data fields:

| | |
|---|---|
| Database ID | TN00000000012222222222 |
| Timestamp | 22222222222 |
| Controller A Serial Number | TN000000001 |
| Controller B Serial Number | TN000000002 |

After marking such a volume for export, the identification information for the storage subsystem may be altered to values assured to identify no storage subsystem. Such identification information may therefore be understood by a storage controller to indicate that the volume being imported is foreign with respect to that controller. For example, the above exemplary configuration information may be modified as exemplified below to indicate no storage subsystem identifies the volume as "native".

| | |
|---|---|
| Database ID | 00000000000333333333333 |
| Timestamp | 33333333333 |
| Controller A Serial Number | 00000000000 |
| Controller B Serial Number | 00000000000 |

These exemplary values are merely intended to suggest one possible approach to storing and updating information indicating that the corresponding disk drive (and hence volume) is foreign with respect to all storage subsystems. Those of ordinary skill in the art will recognize a wide variety of similar indicia that may be used to indicate that a volume is foreign with respect to all storage subsystems. For example, each value may be written to an invalid value or a new, unique value known not to be native in any storage system. Numerous equivalent data structures and values may be used for such indicia.

While the invention has been illustrated and described in the drawings and foregoing description, such illustration and description is to be considered as exemplary and not restrictive in character. One or more exemplary embodiments of the invention and minor variants thereof have been shown and described. Protection is desired for all changes and modifications that come within the spirit of the invention.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for importing a storage device into a storage subsystem comprising:
exporting the storage device;
removing the storage device from a storage subsystem; and
importing the storage device into a storage subsystem such that the exported storage device is recognized as a foreign storage device in the storage subsystem into which it is imported.

2. The method of claim 1 wherein the step of exporting comprises:
altering configuration data stored on the storage device.

3. The method of claim 2 wherein the step of altering comprises:
writing configuration information on the storage device such that the configuration information will indicate that the storage device is a foreign storage device in any storage subsystem in which it is later inserted.

4. The method of claim 3 wherein the step of writing comprises one or more of the following steps:
writing a database identifier to a new value;
writing a timestamp to a new value; and
writing a controller identifier to a new value.

5. The method of claim 1 wherein the storage device is a storage volume consisting of a plurality of storage elements and wherein the step of exporting comprises:
altering configuration data stored in each of the plurality of storage elements.

6. The method of claim 5 wherein the step of altering comprises:
writing configuration information on said each storage element such that the configuration information will indicate that said each storage element is a foreign storage device in any storage subsystem in which it is later inserted.

7. The method of claim 6 wherein the step of writing comprises one or more of the following steps:
writing a database identifier to a new value;
writing a timestamp to a new value; and
writing a controller identifier to a new value.

8. A system for importing a storage device into a storage subsystem comprising:
means for exporting the storage device;
means for removing the storage device from a storage subsystem; and
means for importing the storage device into a storage subsystem such that the exported storage device is recognized as a foreign storage device in the storage subsystem into which it is imported.

9. The system of claim 8 wherein the means for exporting comprises:
means for altering configuration data stored on the storage device.

10. The system of claim 9 wherein the means for altering comprises:
means for writing configuration information on the storage device such that the configuration information will indicate that the storage device is a foreign storage device in any storage subsystem in which it is later inserted.

11. The system of claim 10 wherein the means for writing comprises one or more of the following:
means for writing a database identifier to a new value;
means for writing a timestamp to a new value; and
means for writing a controller identifier to a new value.

12. The system of claim 8 wherein the storage device is a storage volume consisting of a plurality of storage elements and wherein the means for exporting comprises:
means for altering configuration data stored in each of the plurality of storage elements.

13. The system of claim 12 wherein the means for altering comprises:
means for writing configuration information on said each storage element such that the configuration information will indicate that said each storage element is a foreign storage device in any storage subsystem in which it is later inserted.

14. The system of claim 13 wherein the means for writing comprises one or more of the following:
means for writing a database identifier to a new value;
means for writing a timestamp to a new value; and
means for writing a controller identifier to a new value.

15. A computer readable storage medium tangibly embodying program instructions providing a method for importing a storage device into a storage subsystem, the method comprising:
exporting the storage device;
removing the storage device from a storage subsystem; and
importing the storage device into a storage subsystem such that the exported storage device is recognized as a foreign storage device in the storage subsystem into which it is imported.

16. The computer readable storage medium of claim 15 wherein the method step of exporting comprises:
altering configuration data stored on the storage device.

17. The computer readable storage medium of claim 16 wherein the method step of altering comprises:
writing configuration information on the storage device such that the configuration information will indicate that the storage device is a foreign storage device in any storage subsystem in which it is later inserted.

18. The computer readable storage medium of claim 17 wherein the method step of writing comprises one or more of the following steps:
writing a database identifier to a new value;
writing a timestamp to a new value; and
writing a controller identifier to a new value.

19. The computer readable storage medium of claim 15 wherein the storage device is a storage volume consisting of a plurality of storage elements and wherein the method step of exporting comprises:
altering configuration data stored in each of the plurality of storage elements.

20. The computer readable storage medium of claim 19 wherein the method step of altering comprises:
writing configuration information on said each storage element such that the configuration information will indicate that said each storage element is a foreign storage device in any storage subsystem in which it is later inserted.

21. The computer readable storage medium of claim 20 wherein the method step of writing comprises one or more of the following steps:
writing a database identifier to a new value;
writing a timestamp to a new value; and
writing a controller identifier to a new value.

* * * * *